Patented Sept. 1, 1953

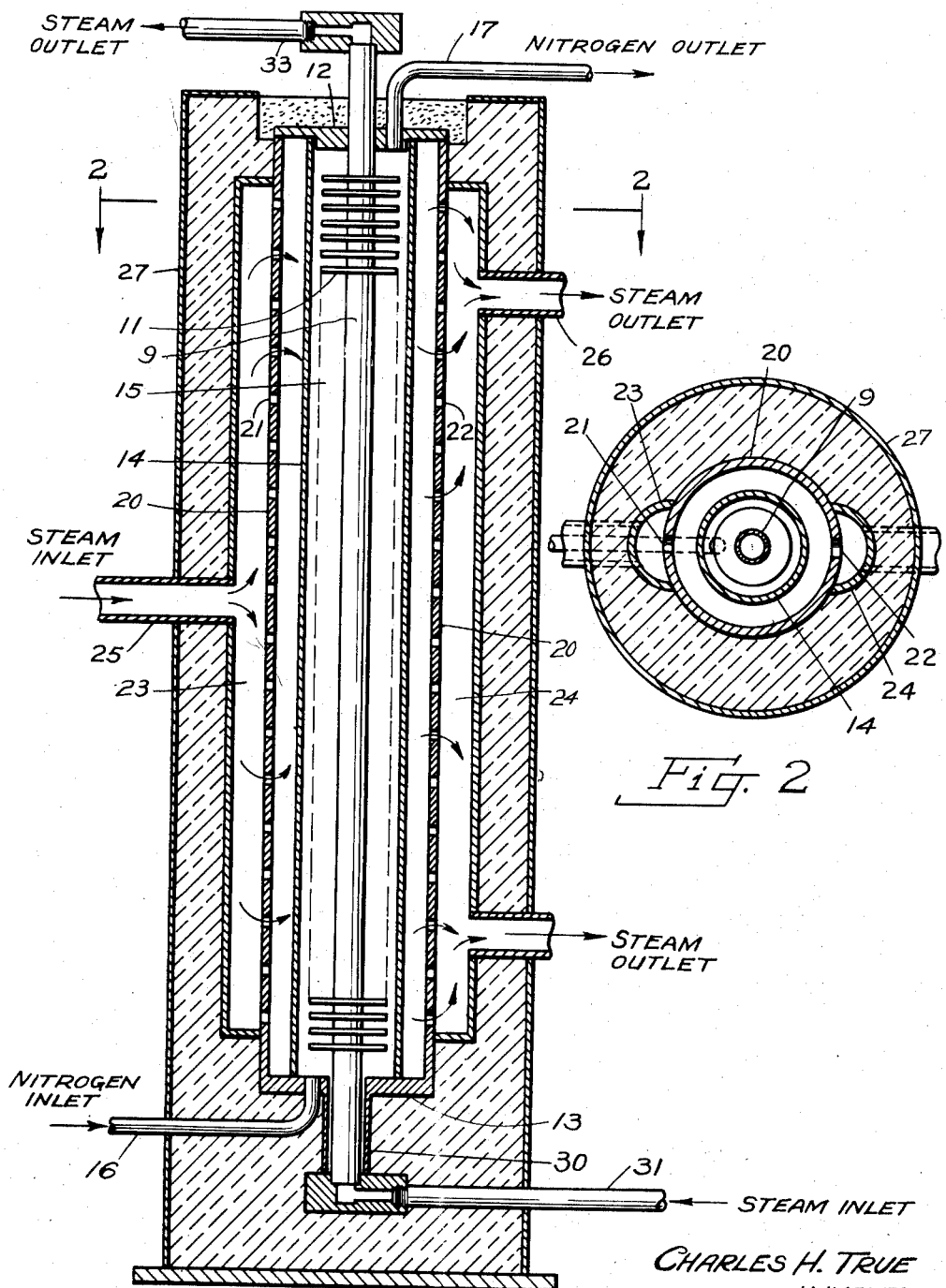

2,650,420

UNITED STATES PATENT OFFICE 2,650,420

METHOD AND APPARATUS FOR BRAZING ALUMINUM FINS TO STEEL TUBES

Charles H. True, Chicago, Ill., assignor to Combustion Engineering, Inc., a corporation of Delaware Application December 10, 1946, Serial No. 715,199

10 Claims. (Cl. 29—368)

The present invention relates to an improved method and apparatus for bonding non-ferrous members to ferrous bodies and particularly to brazing aluminum fins to steel tubing.

Although various methods have been proposed for brazing aluminum to steel some of them have involved the use of a flux whose temperature had to be held within a very narrow range which approached the melting point of the aluminum parts. The control of the heating of the aluminum and steel parts has been found difficult particularly when relatively long steel tubes of small diameter have had aluminum fins applied thereto because in some instances the aluminum disks melted before the tube to which they were to be brazed became sufficiently warm. In many instances it has been found quite difficult to bring the temperature of the steel tube up to the desired level before or simultaneously with a heating of the disks to the brazing heat. In other instances it has been found that maintaining the brazing flux heated over an extended period while the tube is being raised to brazing heat results in some deterioration of the flux which results in an inferior bond.

An object of the present invention is to overcome the aforementioned difficulties in brazing aluminum fins to steel tubes and it is contemplated doing this by circulating a heated fluid through the interior of the tube simultaneously with heating of its exterior surface and the aluminum fins that are to be brazed thereto.

The invention will be best understood upon consideration of the following detailed description of an illustrative embodiment thereof when read in conjunction with the accompanying drawing in which:

Figure 1 is a diagrammatic view, partly in section, of an apparatus for carrying out the improved method, and Figure 2 is a transverse sectional view on the line 2—2 in Figure 1.

The tube 9 to which a plurality of transverse fins 11 are to be brazed is supported in and extends through the end closures 12 and 13 of a metallic cylinder 14 which surrounds the greater part of the length of the tube and forms a heating oven 15 therefor. Inlet and outlet connections 16 and 17 are provided through the end members 12 and 13 so that a neutral atmosphere may be provided within the heating oven by circulating nitrogen or other appropriate gas therethrough. Surrounding the oven 15 is a cylindrical jacket 20 provided at diametrically located points with a plurality of apertures 21 and 22 arranged in rows axially of the jacket wall and communicating respectively with semi-circular headers 23 and 24. Steam is supplied through an inlet connection 25 and taken off through outlet connections 26 for heating the jacket space surrounding the oven 15 so that heat may be imparted to the nitrogen atmosphere contained within the latter so as to raise the fins 11 and the exterior surface of the tube 9 to the brazing temperature. The oven 15 and its heating jacket 20 are preferably enclosed within a casing 27.

In accordance with the invention, the steel tube is first thoroughly cleaned on its exterior surfaces and a brazing flux together with rings of brazing material suitable for producing a brazed joint are placed on the aluminum fins 11 where the fins will come in contact with the tube. The fins together with rings of brazing material and flux while being assembled on the tube are spaced properly by means of suitable collar members or the like which are later removed. With the end closure 12 of the oven 15 removed, the tube and fins assembled thereon may be inserted axially into the oven 15 with the distal unfinned end portion of the tube seated in a cylindrical stirrup 30 projecting from the end wall 13 of the oven. This stirrup member 30 also forms a connection for admitting steam to the interior of the tube through the steam inlet pipe 31 in communication with the bore of the stirrup beyond the end of the tube 9. The end closure 12 for the oven 15 is then fitted over the tube to seal the oven and the supply of nitrogen or other neutral atmosphere turned on to fill the interior of the oven 15 with a neutral atmosphere. Steam supplied to and circulated through the interior of jacket 20 by means of the inlet and outlet connections 25 and 26 heats the oven 15 and the atmosphere of nitrogen contained therein till its temperature approaches the brazing temperature, while superheated steam supplied to the interior of the tube 9 through the inlet pipe 31 and taken from its opposite end which projects from the cover 12 through a suitable offtake connection 33 that may be applied to the tube and raises the temperature of the tube to the desired brazing temperature thus establishing the brazing bond. By circulating superheated steam or other appropriate fluid through the interior of the tube simultaneously with heating of the fins thereon the reluctant metal e. g. steel, is heated to the brazing temperature before the aluminum fins are and consequently the danger of melting the fins by continued application of heat in an effort to raise the steel tube to the brazing temperature is avoided. Generally speaking, the heat, or temperature level in oven 15 which has to be maintained during the brazing process, has the purpose of preventing any heat loss in the tube when superheated steam at the desired temperature is being admitted to the steel tubing. The correct temperature for brazing aluminum fins to a steel tube is 1130° F. and in order to obtain this temperature for the total length of the tubing the temperature in the oven must be maintained very close to but not higher than 1130° F. It has been found that in order to obtain a perfect brazing bond the heat flow should be from the steel tube to the fins and not in the opposite direction. After the tube and fins thereon have been heated for a sufficient length of time to braze them, they may be quickly cooled by blowing saturated steam through the tube.

What I claim is:

1. The method of brazing metallic fins to a metallic tube which comprises applying a brazing flux to the surfaces to be bonded, mounting the fins on the tube and applying brazing material; surrounding the portion of the tube carrying the fins with a gaseous atmosphere; and heating said gaseous atmosphere to a high temperature approaching the brazing temperature while simultaneously circulating a fluid heated to the brazing temperature through the interior of said tube.

2. The method of brazing metallic fins to a metallic tube which comprises applying a brazing flux to the surfaces to be bonded, mounting the fins on the tube and applying brazing material; surrounding the portion of the tube carrying the fins with a neutral gaseous atmosphere such as nitrogen; and heating said gaseous atmosphere until its temperature approaches close to the brazing temperature while simultaneously circulating a heated fluid, such as superheated steam, at approximately the brazing temperature through the interior of said tube.

3. The method of brazing non-ferrous fins to a ferrous tube which comprises applying a brazing flux to the surfaces to be bonded, mounting the fins on the tube and applying a brazing material; surrounding the portion of the tube carrying the fins with a neutral gaseous atmosphere such as nitrogen; and heating said gaseous atmosphere to a high temperature approaching the brazing temperature while simultaneously circulating a fluid, such as superheated steam, heated to the brazing temperature through the interior of said tube.

4. The method of brazing aluminum fins to a steel tube which comprises applying a brazing flux to the surfaces to be bonded, mounting the fins on the tube and applying a brazing material; surrounding the portion of the tube carrying the fins with a neutral gaseous atmosphere such as nitrogen; and heating said gaseous atmosphere to a high temperature approaching the brazing temperature while simultaneously circulating a fluid, such as superheated steam, heated to the brazing temperature through the interior of said tube.

5. Apparatus for brazing metallic fins to a metallic tube comprising a closed oven; means for supporting a tube having fins mounted thereon within said oven with end portions of tube projecting therefrom, means for heating the atmosphere within said oven to a high temperature approaching the brazing temperature for imparting heat to the exterior of said tube and the fins thereon; and means connetced to the ends of said tube for circulating a heated fluid therethrough for heating the tube to the brazing temperature from the inside thereof.

6. The method of brazing metallic fins to a metallic tube which comprises; applying brazing material and flux to the surfaces to be bonded; mounting the fins on the tube; surrounding the exterior of the tube with a gaseous atmosphere and heating said atmosphere for applying heat to the surfaces of the fins and the exterior of the tube to raise the temperature thereof to a temperature approaching close to but less than the brazing temperature; and heating the interior of the tube by circulating a heated fluid therethrough to raise the temperature of the surfaces to be bonded to the brazing temperature.

7. The method of brazing a thin metallic member to the outer surface of a hollow metallic body which comprises; applying brazing material and flux to the surfaces to be bonded; heating said metallic member and the outer surface of sad metallic body by surrounding the exterior of the body with a gaseous atmosphere heated to a temperature close to but not higher than the brazing temperature; and simultaneously heating said body from the interior thereof by circulating therethrough a fluid heated sufficiently to raise the temperature of said body and said member to the brazing temperature.

8. The method of brazing a thin metallic member to the outer surface of a hollow body which comprises; applying brazing material and flux to the surfaces to be bonded; heating said metallic member and the outer surface of said metallic body surrounding the exterior of said body with a gaseous atmosphere heated to a temperature close to but not higher than the brazing temperature; and simultaneously heating said body from the interior thereof by circulating therethrough a fluid heated to temperature sufficient to raise the temperature of said body and said member to the brazing temperature; and continuing the application of heat by said gaseous fluid during the brazing process.

9. The method of brazing a thin metallic member to the outer surface of a hollow metallic body which comprises; applying brazing material and flux to the surfaces to be bonded; heating said metallic member and the outer surface of said metallic body by surrounding the exterior of the body with a gaseous atmosphere heated to a temperature close to but not higher than the brazing temperature; and simultaneously heating said body from the interior thereof by circulating therethrough a fluid heated sufficiently to raise the temperature of said body and said member to the brazing temperature; continuing the application of heat by said heated gaseous atmosphere during the brazing process; and cooling said body and member by circulating a cooling fluid throuugh said body after said brazing temperature has been maintained the required length of time.

10. Apparatus for brazing a thin metallic member to a hollow metallic body comprising; means for supporting said body and member; means for surrounding said body and member with a gaseous atmosphere heated to a high temperature that is less than the brazing temperature for heating said member and the exterior surface of said body to a high temperature but less than the brazing temperature; and means for circulating a fluid heated to at least the brazing temperature through said body for heating said body to heat said body and member to the brazing temperature.

CHARLES H. TRUE.

References Cited in the file of this patent

UNITED STATES PATENTS

| Number | Name | Date |
|---|---|---|
| 858,258 | Briscoe et al. | June 25, 1907 |
| 1,445,220 | Lee | Feb. 13, 1923 |
| 2,023,931 | McCullough | Dec. 10, 1935 |
| 2,081,303 | Karmazin | May 25, 1937 |
| 2,091,307 | Catlett et al. | Aug. 31, 1937 |
| 2,160,633 | Young | May 30, 1939 |
| 2,214,582 | Hansen | Sept. 10, 1940 |
| 2,226,944 | Reeve | Dec. 31, 1940 |
| 2,424,919 | Bosomworth | July 29, 1947 |
| 2,414,312 | Lee | Jan. 14, 1947 |
| 2,450,120 | Cate | Sept. 28, 1948 |

FOREIGN PATENTS

| Number | Country | Date |
|---|---|---|
| 165,764 | Great Britain | July 7, 1922 |

OTHER REFERENCES

Iron Age, July 11, 1946, p. 56.